W. B. PAYNE.
MERRY-GO-ROUND.
APPLICATION FILED SEPT. 2, 1914.

1,202,214.

Patented Oct. 24, 1916.
5 SHEETS—SHEET 1.

W. B. PAYNE.
MERRY-GO-ROUND.
APPLICATION FILED SEPT. 2, 1914.

1,202,214.

Patented Oct. 24, 1916.
5 SHEETS—SHEET 2.

Witnesses

Inventor
Walter B. Payne
By
his Attorneys

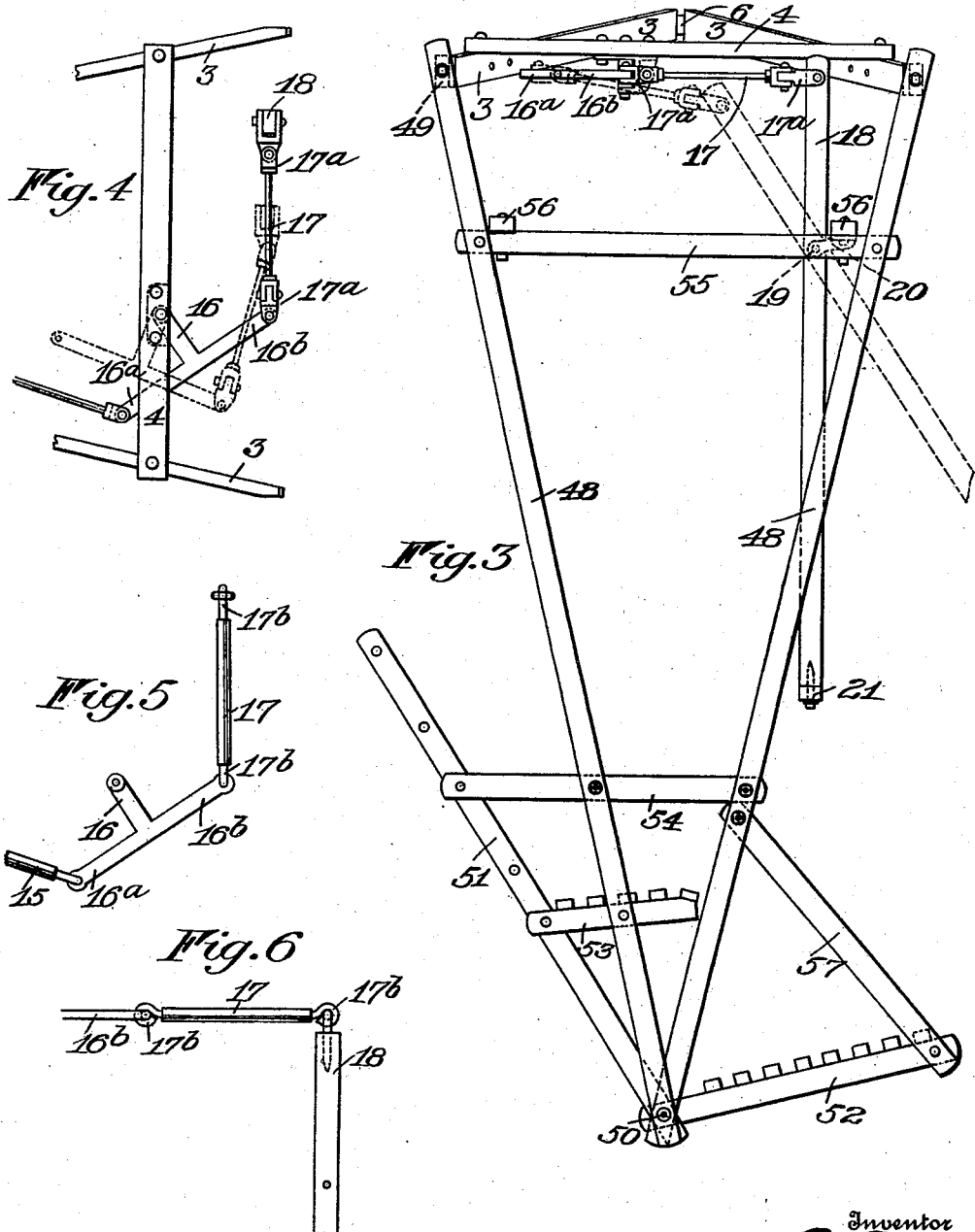

W. B. PAYNE.
MERRY-GO-ROUND.
APPLICATION FILED SEPT. 2, 1914.
1,202,214.
Patented Oct. 24, 1916.
5 SHEETS—SHEET 4.
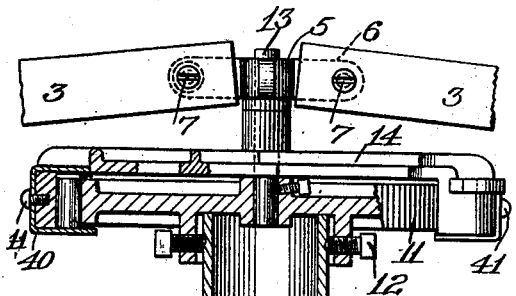
Fig. 7
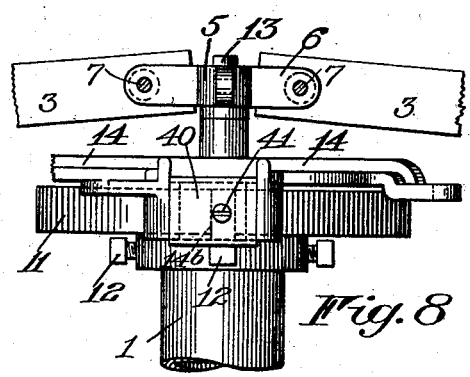
Fig. 8
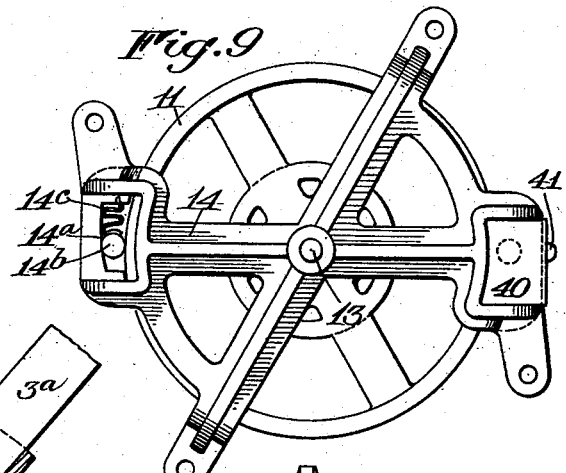
Fig. 9
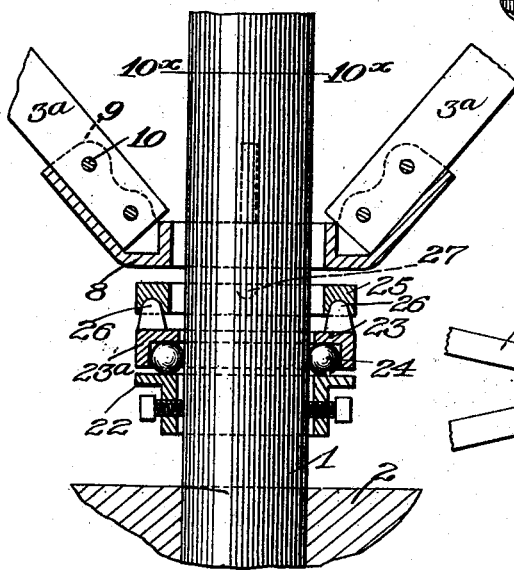
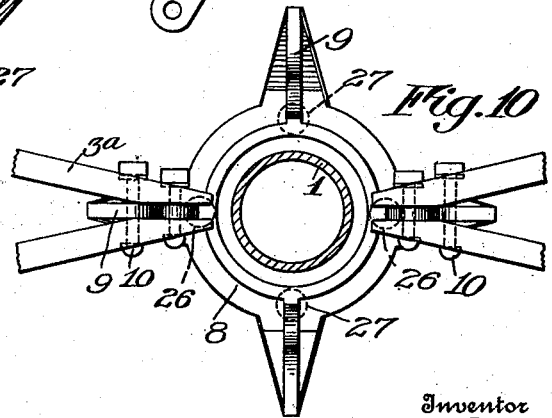
Fig. 10
Witnesses
Nelson H. Copap
Russell B. Griffith
Inventor
Walter B. Payne
By Churchill Rich
his Attorneys
THE NORRIS PETERS CO., WASHINGTON, D. C.

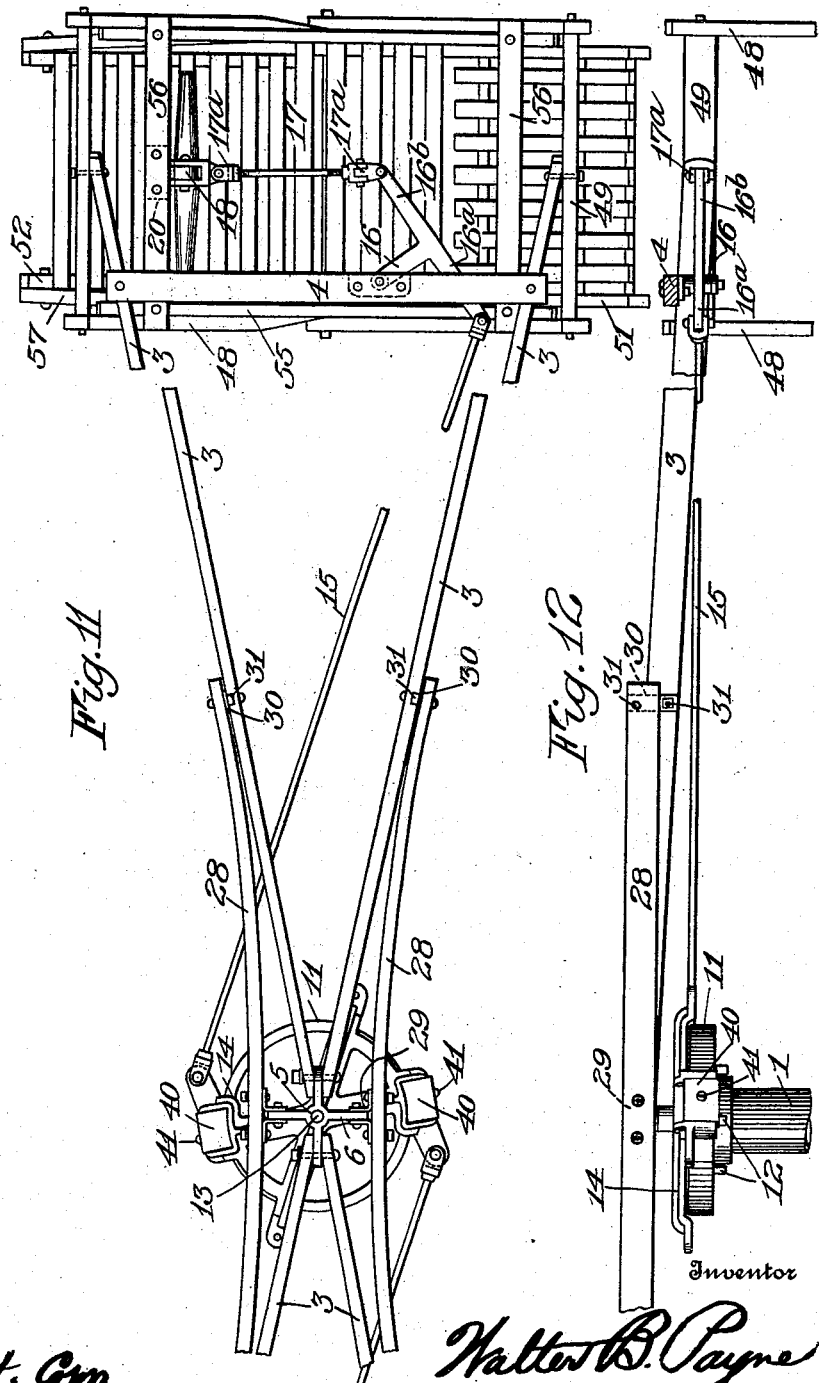

UNITED STATES PATENT OFFICE.

WALTER B. PAYNE, OF ROCHESTER, NEW YORK.

MERRY-GO-ROUND.

1,202,214.  Specification of Letters Patent.  Patented Oct. 24, 1916.

Application filed September 2, 1914. Serial No. 859,876.

*To all whom it may concern:*

Be it known that I, WALTER B. PAYNE, of Rochester, in the county of Monroe and State of New York, have invented certain new and useful Improvements in Merry-Go-Rounds; and I do hereby declare the following to be a full, clear, and exact description of the same, reference being had to the accompanying drawings, forming a part of this specification, and to the reference-numerals marked thereon.

My present invention relates to amusement devices and more particularly to merry-go-rounds of the self-propelled type such as are provided for the amusement of children, and the invention has for its special object to produce a simple, convenient and durable device of this nature in which are combined two motions, one of which is effected through the agency of the other at the instance of the occupant or occupants of the merry-go-round.

To these and other ends the invention consists in certain improvements and combinations of parts all as will be hereinafter more fully described, the novel features being pointed out in the claims at the end of the specification.

Figure 1:
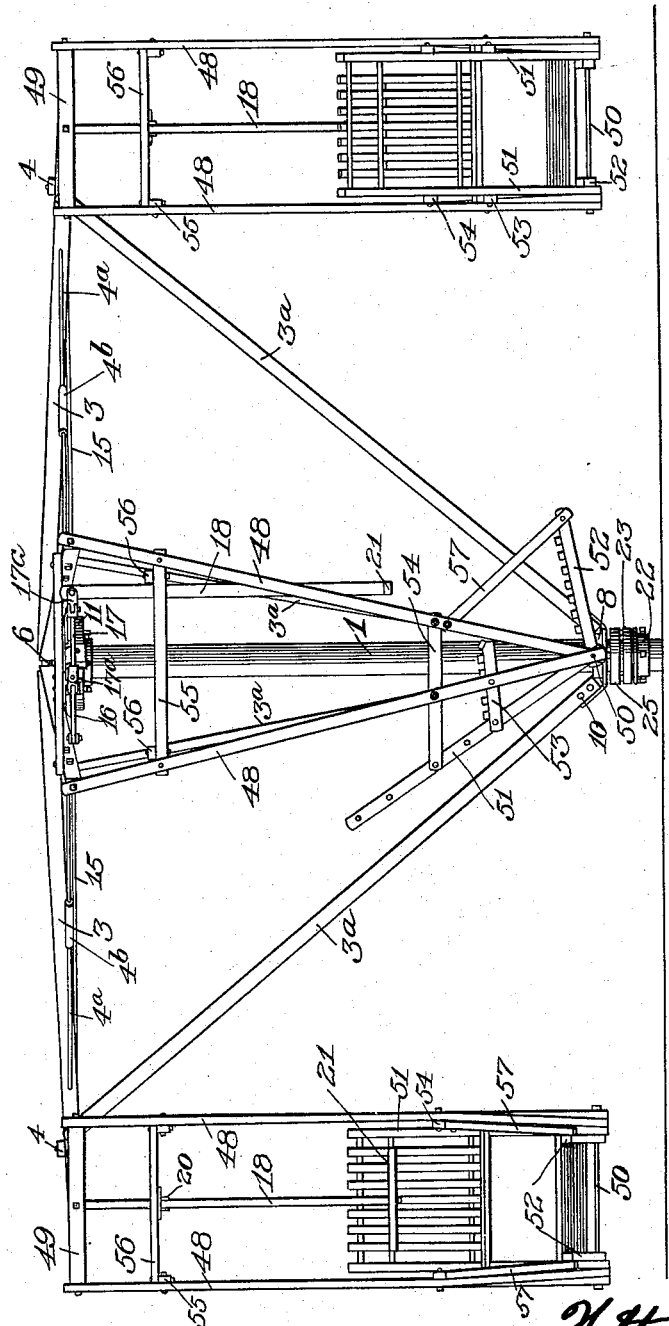
Figure 2:
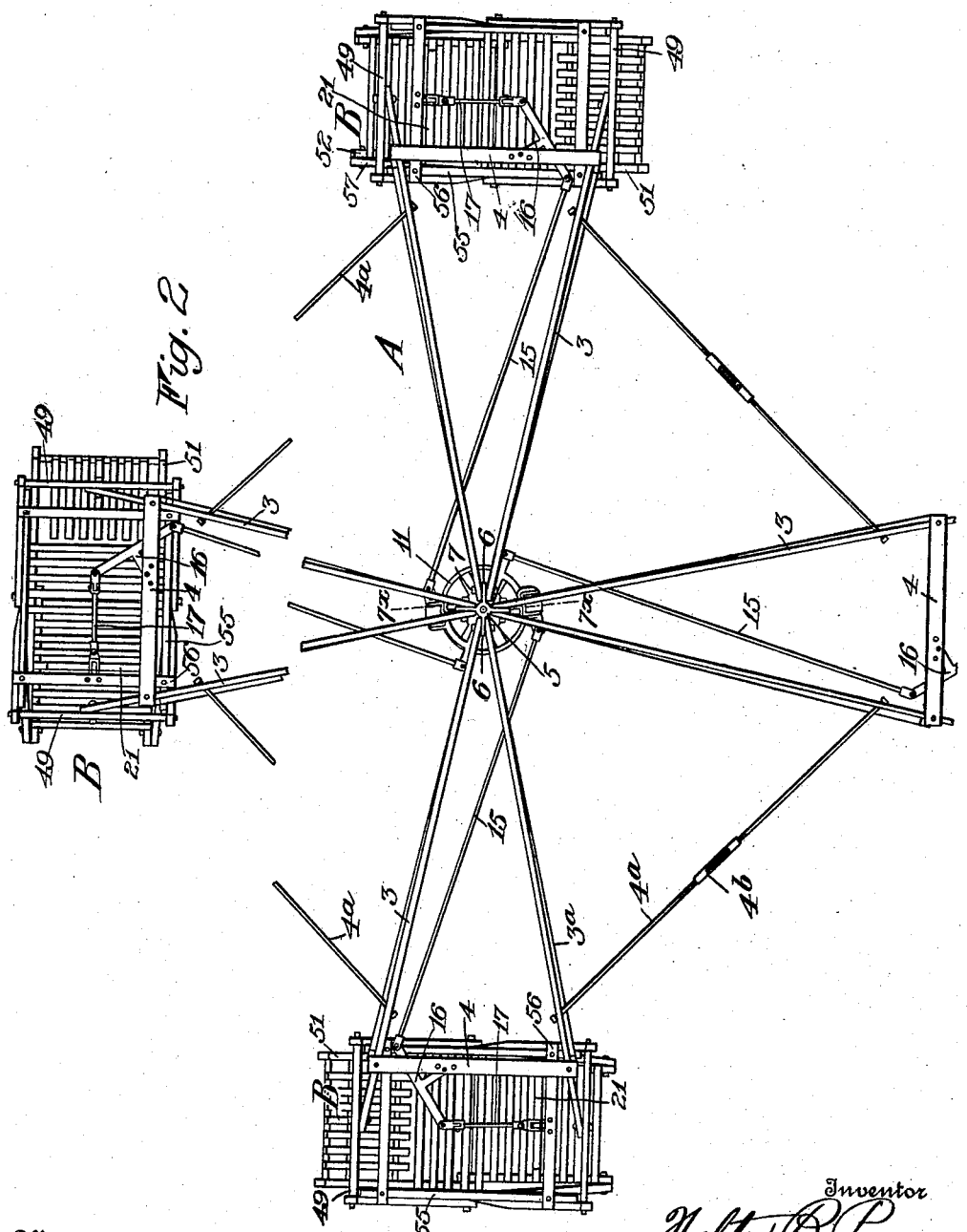

In the drawings: Figure 1 is a side elevation of a merry-go-round constructed in accordance with and illustrating one embodiment of my invention, in which four seats or swings are employed; Fig. 2 is a top view thereof; Fig. 3 is a side view of one of the seats; Fig. 4 is a top view of the outer end of one pair of radial bars of the carrier showing a portion of the driving connection; Fig. 5 is a similar view of a modified structure; Fig. 6 is a side elevation of the structure shown in Fig. 5; Fig. 7 is a detail vertical sectional view through the two central bearings for the carrier, on the line $7^x$—$7^x$ of Fig. 2; Fig. 8 is an elevation of the parts shown at the top of Fig. 7 at right angles to said figure; Fig. 9 is a top view of the parts shown in Fig. 7; Fig. 10 is a horizontal sectional view on the line $10^x$—$10^x$ of Fig. 7; Fig. 11 is a top view of a merry-go-round employing two seats, and Fig. 12 is a side elevation of the upper end thereof.

Similar reference numerals throughout the several figures indicate the same parts.

In the practice of my invention I employ a main rotary carrier, and one or more cars or seats carried thereby and adapted to move relatively thereto, and I provide suitable mechanism whereby the occupant of the seat may cause the rotation of the carrier by actuating a driving member carried by and relatively movable to the carrier, and operatively connected to the support. In the present embodiment there are employed a rotary carrier A revoluble about a vertical axis and a plurality of seats or swings B pivoted at their upper ends at intervals about the periphery of the carrier and movable relatively to the carrier in a fixed path about axes arranged tangentially with respect to the center of rotation of the carrier so that as the latter revolves they swing outwardly by centrifugal force. I preferably use as a vertical support for the carrier a cylindrical upright such as a tubular steel or iron post 1, solidly anchored in the ground as by cement 2. The carrier A embodies a plurality of pairs of radial bars 3, the bars of each pair being preferably united near their outer ends by cross bars 4. The bars 3 are united at their inner ends by a connecting member 5 revolving on a bearing at the top of the post and provided with radial ears 6 projecting between the ends of the bars 3 which are secured thereto by bolts 7. The outer ends of the bars are supported by uprights $3^a$ extending from points near the outer ends of the bars 3 to a lower annular connecting member 8 revolving on a bearing at the foot of the support 1, said member having ears 9 projecting between the lower ends of each pair of uprights $3^a$ which are secured thereto by bolts 10. The several pairs of bars 3 are further connected near their outer ends by braces $4^a$ preferably of wire and drawn taut by turnbuckles $4^b$ making a rigid carrier frame.

The swings or seats B may be of any desired form, each swing being supported on pivots at the outer ends of the radial bars 3.

In order to propel the carrier from the swings, I employ a manually actuated operating member carried by each swing and provide means whereby power may be transferred therefrom and applied to the support at a point removed from the center in such a manner as to cause revolution of the carrier. To this end, I mount on the carrier a driving member movable relatively thereto, said driving member being operatively connected to the operating member and adapted to transmit power to the support.

In the present embodiment of my invention, I secure to the top of the post by set screws 12 or in any other desired manner, a clutch member or disk 11, and carried by said disk is a pin 13, which serves as a bearing for the connecting member 5 and also for an oscillating clutch lever 14 which may be moved freely in one direction but is locked to the disk 11 when an attempt is made to move it in the opposite direction. The clutch lever is pivoted at its center on the bearing 13 adjacent the disk 11, and its ends overhang the latter and are provided with tapered recesses 14$^a$ which are closed on their inner sides by the clutch disk 11. Rollers 14$^b$ are accommodated within the recesses and are normally moved toward the small ends thereof by springs 14$^c$ or any other means, the rollers being held in the recesses by U-shaped sheet metal plates 40 slipped over the edge of the lever and held in place by screws 41. The clutch lever 14 is connected by driving members in the form of links or rods 15 to the inner ends 16$^a$ of the bell crank levers 16 pivoted in bearings on the cross bars 4. The outer ends of the arms 16$^b$ of the levers, swing so as to move in paths practically coincident with the pivotal axes of the swings B. Links 17 connect the arms 16$^b$ of the levers 16 with the upper ends of operating members in the form of levers 18 pivoted at 19 to bearings 20 on the swings and provided with cross bars 21 at their lower ends. The upper ends of the levers 16 also travel in paths practically coincident with the pivotal axes of the swings B, consequently the links 17 move in substantial alinement with the pivotal axis and transmit power to the levers 16 in a direction intersecting a point on the pivotal axis and therefore without exerting any tendency to cause an inward or outward motion of the swings about their pivots. The swinging movement of the levers 18 and 16 during operation is permitted by the provision of universal joints 17$^a$ at both ends of the links 17, one of which is loosely threaded on the link so as to allow the outward motion of the swing, or instead of the universal joints the same results are obtained by providing eyes 17$^b$ on the links 17 engaging in similar eyes at the ends of the levers 18 and 16, as shown in Figs. 5 and 6.

In order to provide a bearing for the annular connecting member 8, a collar 22 is fastened firmly to the post 1 by set screws or otherwise, and a bearing collar 23 with an overhanging flange 23$^a$ is arranged to revolve freely thereon by means of ball bearings 24 included between the flange 23$^a$ and the post 1. A ring 25 is pivoted to the collar 24 at points 26 on opposite sides of the post and the connecting member 8 is in turn pivoted to the ring 25 at points 27 half way between the points 26. The collar 24 is by this arrangement allowed a universal motion to compensate for weaving of the carrier or any inadvertent inaccurate adjustment of the collar 22.

While the construction of the swings is not essential to my invention, I prefer the construction shown in which are used two pairs of parallel supporting bars 48 each pair connected by a cross bar 49 at their upper ends, and the lower ends of the bars 48 on the same side of the swing converge so that they overlap and are secured together by a common bolt 50. The seat back and footboard comprise side bars 51 and 52, respectively, which are connected at their ends by the bolt 50, the outer end of the foot board being braced by bars 57, attached to the forward bars 48. Cleats 53 supporting the seat and arm rests 54 on either side of the swing are secured to the back bars 51 and supporting bars 48. In order to prevent the separation of the pairs of bars 48, they are united by tie bars 55 near their upper ends, the frame being further braced by cross bars 56 secured to the bars 55. The front cross bar carries the bracket 20 to which is pivoted at 19 the operating lever 18. The outer ends of the radial arms 3 are included by the cross bars 49 which are pivoted at their middle points to the ends of said radial arms and when the swing is stationary are in the plane of the radial arms.

In Figs. 11 and 12 I have shown the device employing only two swings. In this case, the opposite pairs of diametrically opposite radial bars 3 are braced by bars 28 fastened at their middle points by means of angle plates 29 to the ears 6 of the connecting member 5 and bearing on the outer sides of the bars 3 to which they are fastened at their extreme ends by the plate 30 and bolts 31.

It will be seen that I have provided a merry-go-round which is of simple and cheap construction, and yet efficient in operation. The unpleasant sensation of falling outwardly experienced by users of the ordinary form of merry-go-rounds with rigid seats, has been obviated in the present construction by means of the pivoted seats which swing outwardly at a greater or less angle according to the speed of the carrier.

I claim as my invention:

1. In a merry-go-round, the combination with a support, a rotary carrier revoluble on the support and a swing pivoted to the carrier, of a driving member movable relatively to the carrier, and adapted to transmit power to the support at a point removed from the center, an operating member on the swing and operative connections between the driving member and operating member, said operative connections embodying a portion movable longitudinally in substantial alinement with the pivotal axis of the swing.

2. In a merry-go-round, the combination with a support, a rotary carrier revoluble on the support and a swing pivoted to the carrier, of a driving member movable relatively to the carrier, and adapted to transmit power to the support at a point removed from the center, an operating member on the swing, an oscillating member on the carrier connected to the driving member, and a connecting member between the oscillating member and operating member whereby motion of the latter may be transferred to a point on the oscillating member movable substantially along the pivotal axis of the swing.

3. In a merry-go-round, the combination with a support, a rotary carrier revoluble on the support and a swing pivoted to the carrier, of means for transmitting power from the swing to a point on the support removed from the axis of rotation of the carrier, said means embodying connected portions carried by the swing and carrier respectively, the motion of the parts at their point of connection being in a direction intersecting a point substantially on the pivotal axis of the swing.

4. In a merry-go-round, the combination with a support, a rotary carrier revoluble on the support and a swing pivoted to the carrier, of a driving member movable relatively to the carrier, and adapted to transmit power to the support at a point removed from the center, an operating member on the swing, an oscillating member on the carrier connected to the driving member, and a connecting member connected to the operating member and oscillating member at points substantially in the pivotal axis of the swing.

5. In a merry-go-round, the combination with a support, having upper and lower bearings, a carrier frame journaled thereon embodying upper and lower connecting members, a bearing collar revoluble on the lower bearing of the support, and a ring between the lower connecting member and the bearing collar, said ring being pivoted to the collar at points on opposite sides of the support, and to the connecting member at points between the first mentioned points.

6. In a merry-go-round, the combination with a support, a rotary carrier revoluble on the support and a swing pivoted at its upper end to the carrier, of an operating lever pivoted to the swing, an annular clutch member fixed on the support, a coöperating member relatively movable with relation to the annular member in one direction, a driving link connected at its inner end to the coöperating member, a lever pivoted to the carrier and connected at its inner end to the outer end of the driving link, and a link connecting the outer end of the lever to the upper end of the operating lever.

7. In a merry-go-round, the combination with a support, a rotary carrier revoluble on the support and a seat pivoted to the carrier, of an operating lever pivoted to the seat, an angle lever pivoted to the carrier, a link connected to the operating lever and angle lever at points substantially in the pivotal axis of the seat, and a driving link connected to the angle lever and adapted to transmit power to a point on the support removed from the pivotal axis of the carrier.

8. In a merry-go-round, the combination with a support, a rotary carrier revoluble on the support and a swing pivoted at its upper end to the carrier, said swing embodying two pairs of parallel supporting bars, the bars on the same side of the swing converging at their lower ends, a cross bar connecting the upper ends of each pair and affording means for pivotally supporting the swing, back and foot sections converging to the point of intersection of the supporting bars, a bolt securing the supporting bars, back and foot sections at their meeting ends and arm rests and seat supporting cleats secured to the back bars and supporting bars.

9. In a merry-go-round, the combination with a support, a rotary carrier revoluble on the support and a swing pivoted at its upper end to the carrier, said swing embodying two pairs of parallel supporting bars, the bars on the same side of the swing converging at their lower ends, a cross bar connecting the upper ends of each pair of bars and affording means for pivotally supporting the swing, back and foot sections converging to the point of intersection of the supporting bars, a bolt securing the supporting bars, back and foot sections at their meeting ends and arm rests and seat supporting cleats secured to the back bars and supporting bars, tie bars on opposite sides of the swing connecting the supporting bars of opposite pairs near their upper ends, cross bars secured to said tie bars, a bracket on one of said cross bars and an operating lever pivoted in the bracket, and means whereby power may be transferred from the operating member to the support.

10. In a merry-go-round the combination with a support and a carrier rotatable thereon, of a swing mounted on the carrier and movable relatively to the carrier in a fixed path about an axis arranged tangentially with respect to the center of rotation of the carrier, and driving means between the carrier and the support, operable by an occupant of the swing.

11. In a merry-go-round the combination with a support and a carrier rotatable thereon, of a swing carried by the carrier and movable about an axis arranged tangentially with respect to the center of rotation of the carrier, a driving mechanism on the carrier coöperating with the support and having an operating portion movable with the swing and operable by an occupant thereof.

12. In a merry-go-round the combination with a support and a rotary carrier movable thereon, said carrier embodying radially arranged bars, of a swing having parallel supporting portions extending on the outer sides of a pair of bars in the plane thereof, and pivoted to the bars at the outer ends thereof.

13. In a circle swing the combination with a support having upper and lower bearings, of a carrier frame journaled on the bearings, the lower bearing embodying a bearing collar having an universal connection with the carrier frame.

14. In a merry-go-round the combination with a support, and a carrier rotatable thereon, of a rigid swing mounted on the carrier and movable relatively thereto in a fixed path about an axis, an operating member having a handle portion movable in a direction parallel with the axis, and driving means between the carrier and support, actuated by the operating member.

15. In a merry-go-round, the combination with a support, and a carrier rotatable thereon, of a rigid swing mounted on the carrier and movable relatively thereto in a fixed path about an axis, an operating lever movable in a plane parallel with the axis, and driving means between the carrier and support actuated by the operating lever.

16. In a merry-go-round the combination with a support, and a carrier rotatable thereon, of a rigid swing mounted on the carrier and movable relatively thereof in a fixed path about an axis, an operating lever pivoted to the swing, and having a portion movable along the axis thereof, and driving means between the carrier and support actuated by the operating lever.

17. In a merry-go-round the combination with a support, and a carrier rotatable thereon, of a rigid swing movable about an axis on the carrier, a seat on the swing facing in the direction of the axis, and a pivoted operating member on the swing movable in a plane parallel with the axis, and driving means between the support and carrier actuated by the operating member.

18. In a merry-go-round, the combination with a support and a rotary carrier revoluble on the support, of a swing supported by the carrier and movable about an axis thereon, driving mechanism on the carrier including a member having a portion movable along the axis, an operating member on the swing also having a portion movable along the axis, and means connecting the first named member and the operating member whereby a relative angular motion of the two members is permitted as the swing moves about its axis.

19. In a merry-go-round, the combination with a support, of a rotary carrier revoluble on the support, and a swing pivoted at its upper end to the carrier, said swing embodying two pairs of parallel supporting bars, the bars on the same side of the swing meeting at their lower ends, and the bars of each pair being connected at their upper ends to provide means for pivotally supporting the swing, and back and foot sections converging to substantially the point of meeting of the supporting bars.

WALTER B. PAYNE.

Witnesses:
RUSSELL B. GRIFFITH,
FREDERICK E. FOX.

Copies of this patent may be obtained for five cents each, by addressing the "Commissioner of Patents, Washington, D. C."